(12) United States Patent
Hubbard, Jr.

(10) Patent No.: US 7,930,852 B1
(45) Date of Patent: Apr. 26, 2011

(54) PORTABLE GUN REST WITH SEAT

(76) Inventor: Billy Joe Hubbard, Jr., Collinsville, OK (US)

( * ) Notice: Subject to any disclaimer, the term of this patent is extended or adjusted under 35 U.S.C. 154(b) by 732 days.

(21) Appl. No.: 11/900,150

(22) Filed: Sep. 10, 2007

Related U.S. Application Data

(60) Provisional application No. 60/843,382, filed on Sep. 9, 2006.

(51) Int. Cl.
*F41A 9/62* (2006.01)
*A47C 1/00* (2006.01)

(52) U.S. Cl. .......... 42/94; 297/377; 297/188.21; 297/4; 297/378.14

(58) Field of Classification Search ...... 42/94; 297/377, 297/188.21, 4, 378.14, 118, 129, 217.1
See application file for complete search history.

(56) References Cited

U.S. PATENT DOCUMENTS

| | | | | | |
|---|---|---|---|---|---|
| 3,589,661 | A | * | 6/1971 | Harris | 248/432 |
| 4,083,068 | A | * | 4/1978 | Bohme | 5/618 |
| 4,266,748 | A | * | 5/1981 | Dalton | 248/425 |
| 4,535,559 | A | * | 8/1985 | Hall | 42/94 |
| 4,886,229 | A | * | 12/1989 | Aripze-Gilmore | 248/125.1 |
| 5,060,410 | A | * | 10/1991 | Mueller | 42/94 |
| 5,149,900 | A | | 9/1992 | Buck | |
| 5,375,905 | A | * | 12/1994 | Flitter et al. | 297/15 |
| 5,481,817 | A | * | 1/1996 | Parker | 248/286.1 |
| 5,491,921 | A | * | 2/1996 | Allen | 42/94 |
| 5,492,255 | A | * | 2/1996 | Gansky et al. | 224/153 |
| 5,688,024 | A | | 11/1997 | Arizpe-Gilmore | |
| 5,715,625 | A | * | 2/1998 | West, III | 42/94 |
| 5,882,079 | A | * | 3/1999 | Yang | 297/377 |
| 5,884,966 | A | * | 3/1999 | Hill et al. | 297/170 |
| 6,015,190 | A | * | 1/2000 | Wend | 297/378.1 |
| 6,058,641 | A | * | 5/2000 | Vecqueray | 42/94 |
| 6,250,712 | B1 | * | 6/2001 | Livington et al. | 297/4 |
| 6,347,406 | B1 | * | 2/2002 | Jones et al. | 2/69 |
| 6,546,662 | B1 | * | 4/2003 | Chong | 42/94 |
| 6,637,708 | B1 | * | 10/2003 | Peterson | 248/285.1 |
| 6,676,208 | B2 | * | 1/2004 | Lu | 297/188.2 |
| 6,895,709 | B1 | * | 5/2005 | Krien et al. | 42/94 |
| 7,032,965 | B2 | | 4/2006 | Howell et al. | |
| 7,086,192 | B2 | * | 8/2006 | Deros | 42/94 |
| 7,152,358 | B1 | * | 12/2006 | LeAnna et al. | 42/94 |
| 7,168,199 | B2 | * | 1/2007 | Krien et al. | 42/94 |
| 7,281,347 | B2 | * | 10/2007 | Carpenter | 42/94 |
| 7,549,247 | B1 | * | 6/2009 | Reese | 42/94 |
| 7,658,140 | B2 | * | 2/2010 | Lombardi | 89/37.04 |
| 7,717,514 | B2 | * | 5/2010 | Redmann | 297/313 |
| 2004/0134113 | A1 | * | 7/2004 | Deros et al. | 42/94 |
| 2007/0124981 | A1 | * | 6/2007 | Krien et al. | 42/94 |
| 2009/0113779 | A1 | * | 5/2009 | Shipman et al. | 42/94 |

OTHER PUBLICATIONS

Mobile Hunter—Hunting Products, www.mobilehunter.com.

* cited by examiner

*Primary Examiner* — Michael Carone
*Assistant Examiner* — Michael D David

(57) ABSTRACT

A portable gun rest that will provide a sturdy, and fully adjustable gun rest support for hunters or target shooters. This includes a fully adjustable and padded gun rest cradle, adjustable gun rest arm, and padded seat in which all can rotate three hundred sixty degrees as a single unit, and which has a backrest for comfort and support. The portable gun rest can be folded into a compact unit, and be transported to any location by being attached and worn around a hunter or target shooter's waist. This invention is also well suited for scopes, and cameras and other equipment.

4 Claims, 3 Drawing Sheets

PORTABLE GUN REST WITH SEAT

CROSS-REFERENCE TO RELATED APPLICATIONS

Provisional Applications No. 60/843,382 Filed on Sep. 9, 2006

FEDERALLY SPONSORED RESEARCH

None.

SEQUENCE LISTING

None

BACKGROUND

This Invention relates to gun rests, in particular to portable gun rests, with seats, that as a single unit can rotate three hundred and sixty degrees.

U.S. Pat. No. 5,149,900 to Buck (1992) discloses a firearm rest with seat, and has an extending arm and cradle to support a portion of a gun, and attached seat that can be pivoted horizontally, and can be folded and transported. However, the arm along with the gun cradle do not allow for a wide range of adjusting, and the seat can only move horizontally that is to and away from the extending arm and cradle. This limited motion does very little for shot placement if the target is moving.

Another method used comes from U.S. Pat. No. 5,688,024 to Arizpe-Gilmore (1997) which discloses a foldable gun rest with a seat and attached backrest that swivels as a single unit. The problem is the gun rest cradle and gun rest arm, in that they do not adjust up and down to accommodate for the user height and does not adjust in or out for the user for adequate shot placement needed in hunting for game or target shooting.

Howell, in U.S. Pat. No. 7,032,965B2 discloses a foldable gun rest with attached backrest and support arm that detaches for either a left or right handed shooter. All rotate as a single unit. The problem with this invention and several others are that they are too big! And bulky, and when they are too big and too bulky they allow for little portability.

In conclusion, in so far as I am aware, no portable gun rests to date, fully address all aspects of a portable gun rest, and those aspects being, stability, adjustability, size, and weight all of which comprise compact ability which makes for portability. The portable gun rest I am introducing will provide a stable gun rest that is adjustable, lightweight, and compact, all of which can easily be folded and carried around ones waist for transportability over any terrain. When set up, the gun rest will allow for an array of angles and height adjustments for shot placement, that can rotate, as a single unit with user, three hundred and sixty degree's.

SUMMARY OF THE INVENTION

A portable gun rest that is made of lightweight and durable materials, that can be folded within itself, into a compact unit that can be worn around the user's waist and transported over any terrain, all the while leaving the user's hands free. This portable gun rest with seat can easily be set up anywhere in a matter of moments, with a multitude of angles and height adjustments, all of which can be locked into place. As a single unit, the adjustable gun rest arm, with gun cradle and ball swivel arm attached to seat can rotate three hundred and sixty degrees with the user, all of while providing comfort and a rock steady shot for the shooter. Still further objects and advantages will become apparent from the study of the following descriptions and drawings.

DRAWINGS

Figure 1:
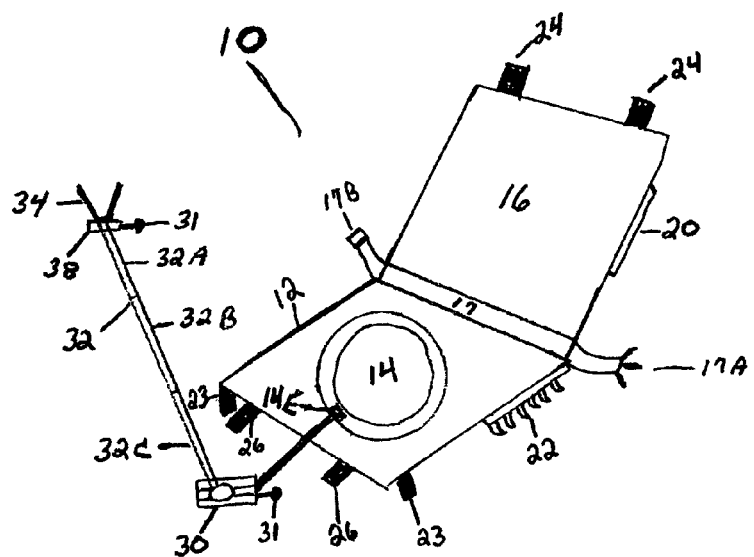
FIG. 1 is a perspective view showing an array of aspects in accordance with the invention, from a top down and side view from user's left side.

DRAWING REFERENCE NUMERALS 10 portable gun rests
12 base
13 bearing track
14 seat
14a outer material
14b seat foam
14c seat base
14d flat plate
14e dual hinged folding plate
15 bearing
16 backrest
16a outer layer material (of backrest)
16b thick foam (of backrest)
16c solid base (of backrest)
17 belt
17a push clip
17b catch clip
18 hinges
20 adjusting bar
22 adjusting support feet
23 stabilizers
24 velcro pitch
26 velcro catch
28 holding clips
30 ball swivel arm
31 tension knobs
32 adjustable gun rest arm
32a top section (of gun rest arm)
32b middle section (of gun rest arm)
32c base section (of gun rest arm)
32d locking pins (of gun rest arm section a, and b)
32e locking pin springs (of gun rest arm section a, and b)
33 base spacer
33a short rod
34 gun cradle
36 pivoting ball bearing
38 adjusting device
40 linking bars (of adjusting device)

42 guide rod (of adjusting device)
44 hangers (of adjusting device)
46 adjusting pins (of adjusting device)
48 spring (of adjusting device)

DETAILED DESCRIPTION OF THE DRAWINGS

This is an overall general view showing an array of aspects of the present invention the portable gun rest and is designated as 10. The portable gun rest 10, has a base 12 (see FIG. 2 and FIG. 3), and has an attached backrest 16 (see FIG. 5 and FIG. 6). Attached in-between base 12 and backrest 16 is an adjustable belt 17 attached at opposite ends of belt 17 is a push clip 17a a catch clip 17b which may be comprised of plastic or by other materials or methods known. Belt 17 may be attached in-between to base 12 and backrest 16 by sewing or by other ways or methods known. Attached to base 12 of portable gun rest 10 is a seat 14. Attached to seat 14 is a ball swivel arm 30 which may be comprised of a metal arm or by other materials known, and having a dual piece comprised of a metal block or by other materials known, and is attached by way of welding or other such methods known. Attached to the side of the dual piece block of ball swivel arm 30 is a tension knob 31, which may be comprised of metal and plastic or by other materials known. This may be attached by screwing in the threaded end of tension knob 31 into a threaded hole located on the side of the dual piece block of ball swivel 30 or by other methods known. Attached to the center of the metal arm of ball swivel arm 30 is a dual hinged folding plate 14e, which may be comprised of flat metal pieces or other materials known, and has a hinge on each side. The dual hinged folding plate 14e may be attached by welding or other methods known, dual hinge 14e is attached to front center of seat 14, by such ways as screws or other material or methods known. Drawing attention back to ball swivel arm 30, attached to ball swivel arm 30's dual piece block and is attached with 33a's short rod to the bottom of base plate 33 by means as welding or other methods known is adjustable gun rest arm 32 with all its components (see FIG. 9), attached to top section of 32a is gun cradle 34 (see FIG. 7), attached to bottom of gun cradle 34, is an adjusting device 38 and all of its components (see FIG. 8), attached by means as welding or other methods known.

Figure 2:
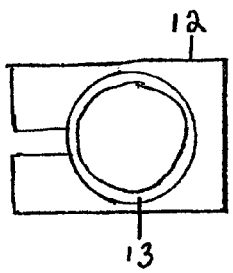
FIG. 2 is a top view showing a base with a removed portion and a bearing track.

Attention is now directed to a top view of base 12, as shown in FIG. 2 which is comprised of a solid material such as a piece of hard plastic, or by other materials known. Base 12 has a removed portion in the front center of the hard plastic of base 12, in which 30,32,34 (see FIG. 7, 8, 9) can be telescopically adjusted down and by means of folding through the removed portion and under to bottom of base 12 (see FIG. 3), 30,32 and 34 can be stored away by means as using holding clips 28 (see FIG. 3). In the center of base 12, (see FIG. 2) is a bearing track 13 bearing track 13 is comprised of a round metal track with sides, or by other materials or methods known, attached to top center of base 12 by means of screws through bearing track 13 base, or by other ways or methods known. The bearing track 13 is to be round in shape to allow a round bearing 15 (see FIG. 6) to travel in a three hundred and sixty degree range of motion on the inside of the bearing track 13. A camouflaged material may cover base 12 by materials that may be weather resistant.

Figure 3:
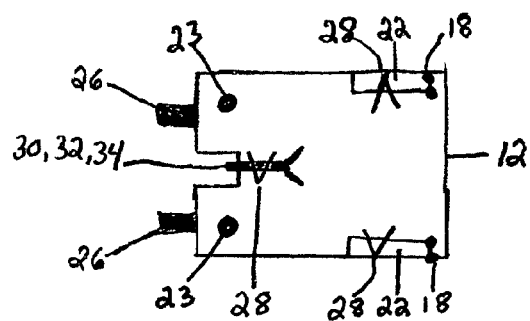
FIG. 3 is a bottom view showing a base and its attached and folded components.

Here is a bottom view of base 12 as shown in FIG. 3 which is of the same hard plastic, or by other materials known with removed portion located at the front end, through which 30, 32, 34 was mentioned in (FIG. 2) can be telescopically adjusted and folded through the removed portion and under to holding clip 28, which may be comprised of a plurality of thin metal pieces, or by other materials known, in a way that will hold 30,32,34 to the bottom of base 12. The holding clip 28 may be attached to bottom of base 12, by screws or by other materials known. At the bottom of base 12 located at the opposite end of 30, 32, 34, is a plurality of adjusting support base feet 22, which may be comprised of metal or by other materials known, and has grooved slots to allow for adjusting of backrest 16 (see FIG. 5), and are attached to a plurality of hinges 18, by screws or by other material known, hinges 18 may be comprised of metal or by other materials known and are attached to bottom of base 12 by screws or other materials known. Adjusting support base feet 22 may be held to bottom of base 12 by means of holding clips 28. At the front corners of the bottom of base 12, is a plurality of stabilizers 23. These may be comprised of hard plastic or by other materials known, and are attached to bottom of base 12, by screws or other materials known, by passing through drilled out centers of stabilizers 23, and into base 12. On the same bottom corners of base 12, are a plurality of Velcro catches 26, which are used to attach to Velcro pitches 24 (see FIG. 1), for securing backrest 16, to base 12, for storage and transport of portable gun rest 10.

Figure 4:
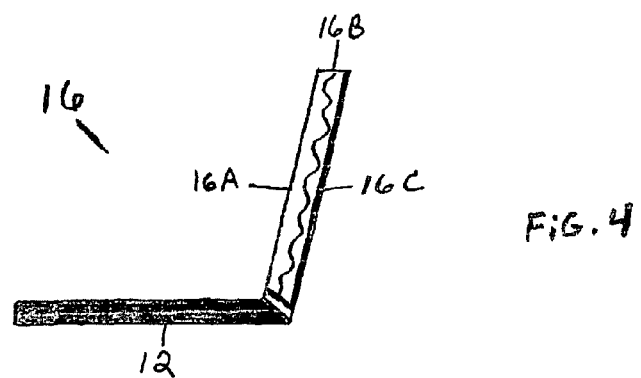
FIG. 4 is a side view showing a backrest having a layered view of its components.

FIG. 4 is a side view of backrest 16, having an outer layer of material 16a, which is comprised of durable weather resistant material, and may be camouflaged, or by other materials and methods known. Backrest 16 has a piece of thick foam 16b, and may be comprised of memory foam, or by other materials known. Then foam 16b, is laid over a solid base 16c, which may be comprised of a hard plastic or by other materials known, then outer material 16a, is to completely cover the foam 16b, and solid piece 16c. Then backrest 16 may be attached to the backend of base 12's weather resistant material, that may be camouflaged, by attaching 16a's outer materials to 12's weather resistant materials by heat sealing or by other material or methods Known.

Figure 5:
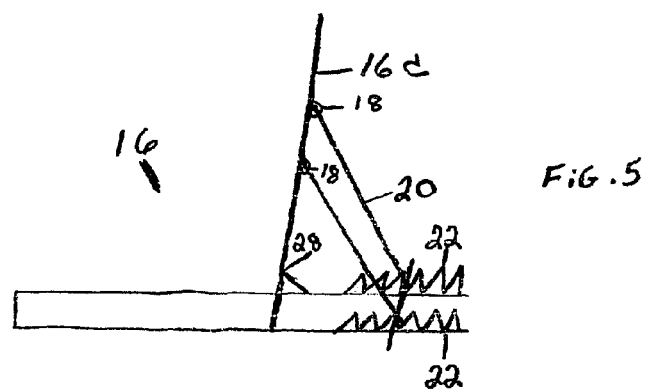
FIG. 5 is a side view showing a backrest seat portion and its components comprising of two support feet and a adjustment bar.

FIG. 5 is a side view of backrest 16, and some of its components, and at the top of the backside of backrest 16, is a plurality of Velcro pitches 24, and are attached to outer material 16a, by an adhesive or by other materials or methods known, and are used with Velcro catches 26 (see FIG. 1), for the securing of backrest 16, to base 12, for storage and the transporting of portable gun rest 10. On the backside of backrest 16, is plurality of hinges 18, which are comprised of metal or by other materials known, are attached to the back of the backrest 16 by screws or by other materials or methods known. Attached to hinges 18, is an adjusting bar 20, which is comprised of metal or by other materials or methods known, and can be placed in the grooves of adjusting support feet 22, for the adjustment of backrest 16, for the user's comfort and for adjustments to help with shot placement. When adjusting bar 20 is not in use adjusting bar 20 can be folded down flat to the back of backrest 16 by a plurality of holding clips 28, comprised of a plurality of thin metal pieces attached to the backside of backrest 16, by screws or by other materials known. Thus when adjusting bar 20 is not in use adjusting bar 20 can be pushed into holding clips 28 for out of the way storage, and with other components mentioned can allow seat 14, to rotate three hundred and sixty degrees.

Figure 6:
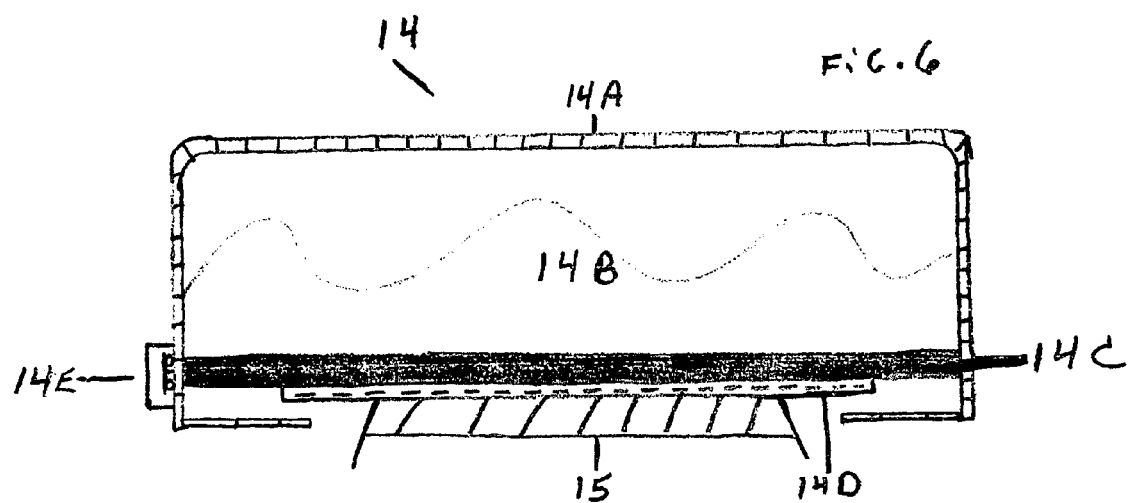
FIG. 6 is a horizontal layered view of seat and its components.

FIG. 6 is a horizontal view of seat 14, which is of round shape or by other shapes known, and has an outer material 14a, which is comprised of a weather resistant material or by other materials known, and this material may be camouflaged, and covers a round piece of foam 14b or by other materials, shapes, or methods known, and may comprised of a memory foam. Outer material 14a, and foam 14b, is laid on to a round shaped solid base 14c, or by other materials, shapes, or methods known, and may be comprised of hard plastic, or by other materials known. And attached to the bottom of solid base 14c, is a flat plate 14d, and comprised of metal or other materials or methods known, and attached to solid base 14c by screws or by other materials or methods known. The outer material 14a is wrapped over foam 14b and base 14c and over a small outer portion of flat plate 14d, and then is attached to flat plate 14d, by screws or by other materials or methods known. And attached to the bottom of flat plate 14d, is a bearing 15, and is attached by welding or by other methods known. And seat 14 has a dual hinged folding plate 14e, and is comprised of metal or by other materials or methods known, and is attached to the front center of seat 14, by screws or by other materials or methods known. Attached to front center seat 14 just above dual hinged folding plate 14e is a holding clip 28 which is used to hold ball swivel arm 30 to seat 14 for adjusting purposes, and to allow for the rotation of seat 14 with ball swivel arm 30 and adjustable gun rest arm 32 and gun cradle 34 as a single unit to rotate in a three hundred and sixty degree radius.

Figure 7:
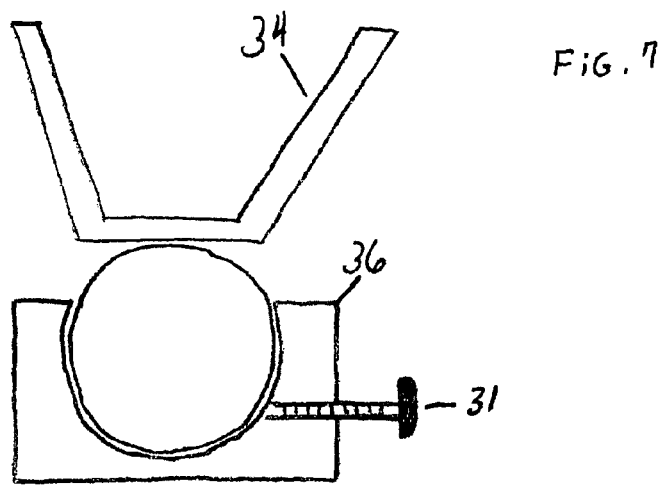
FIG. 7 is a front view showing a v shaped gun cradle and its components.

FIG. 7 is a front view of a gun cradle 34; comprised of metal or by other materials known, by bending a flat metal piece into a v shape using a bending machine or by other methods known. The insides of the v shape may be padded for protection of the user's gun. Attached to the bottom center of the flat piece of the v shape gun cradle 34 is a pivoting ball bearing 36, attached by welding or by other methods known and attached to the side of pivoting ball bearing 36 is a tension knob 31. Comprised of metal and plastic or by other materials or methods known. The tension knob 31 is attached by screwing the threaded end of shaft of tension knob 31 into a threaded hole that protrudes though into pivoting ball bearing 36. And is done for the adjusting of gun cradle 34 in a side to side motion, and also in a forward and backward motion that will allow three hundred and sixty-degree rotation of gun cradle 34 into the position that the user requires.

The user can lock in their selected positions by turning in tension knob 31 into ball bearing 36 thus locking in the user's selected position.

Figure 8:
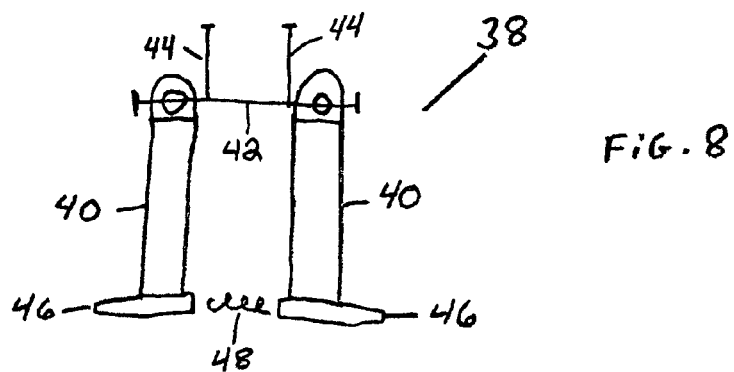
FIG. 8 is a front view showing an adjusting device and its components.

FIG. 8 is a front view of an adjusting device 38, when in a completed form is part of gun cradle 34. The adjusting device 38, has a plurality of linking bars 40 comprised of metal or by other materials known, and having a hole in the top center of each of the linking bars 40 which may be drilled or punched out by a machine or by other methods known, to allow suspending rod 42, which may be comprised of metal or by other materials known, to be slid through the holes of linking bars 40. Adjusting device 38 has a plurality of hangers 44, and may be comprised of metal or by other materials known, and are positioned on top of suspending rod 42 and in between the tops of linking bars 40, by welding or by other methods known. The bottom of the linking bars 40, are attached to the top of a plurality of hollow adjusting pins 46 which may be comprised of metal or by other materials known, and by placing a spring 48, comprised of metal or by other materials known, in-between and on the insides of the hollow adjusting pins 46, which will allow the hollow adjusting pins 46 to push towards one another and when released will spring back away from each other. Then by attaching the tops of hangers 44, by welding or by other methods known to the bottom center of pivoting ball bearing 36, will create gun cradle 34. Then gun cradle 34 can be placed in the inside of adjusting gun rest arm 32 by pushing in on adjusting pins 46 and releasing them in the hole selected in adjusting gun rest arm 32 section a.

Figure 9:
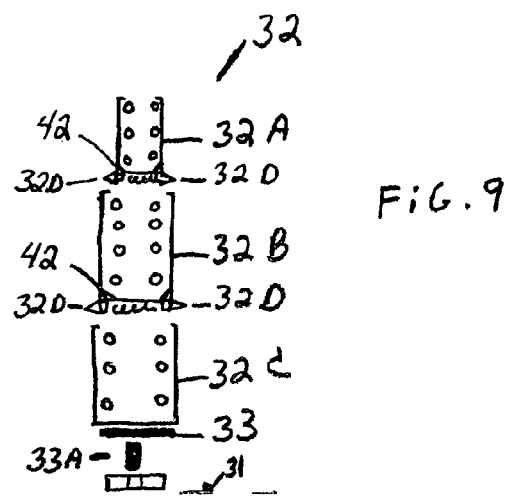
FIG. 9 is a front view of an adjustable gun rest arm and its components.

FIG. 9 is a front view of an adjusting gun rest arm 32, having a plurality of individual arm sections designated 32a, b, c comprised of a light weight metal or by other materials known. Adjusting gun rest arm sections a,b,c have a plurality of holes, or by other methods known, located directly across from each other on all of the adjusting gun rest arm 32 sections a,b,c. And each section a,b,c will be different in dimensions to allow for section a to telescopically fit into center of section b, and for sections a,b now together can fit into center of section c, and sections a and b are to be longer than each other so that they do not slide completely into each other. At the bottom of sections a and b are a plurality of locking pins 32d located opposite each other and that may be comprised of aluminum or by other materials known, having a plurality of components which are compressed together by sliding locking pin springs 32e's into through the back of locking pins 32d's, and then by placing both ends of guide rod 42 into and behind locking pin springs 32e's and then by welding or by other methods known guide rod 42 may be attached to the bottom inside of sections 32a and 32b which will allow for the outer section of locking pins 32d, to be compressed in an in and out motion through a selected set of holes located in each section of a,b, and c, and by lifting of gun cradle 34 and by pushing in on locking pins 32d and by then releasing them into the holes that the user has selected for their shot height will lock gun rest arm sections a,b,c together in the holes selected by the user for their required height for shot placement. At the bottom of gun rest arm section 32c is a base spacer 33, comprised of metal or by other materials known, and may be attached to the bottom of gun rest arm 32 section c by welding or by other methods known. At the bottom center of base spacer 33, is a short rod 33a and may be comprised of metal or by other materials known, and attached to the center of base spacer 33 by welding or by other methods known, in which to attach ball swivel arm 30 by attaching short rod 33a through the hole in the top center of the dual piece block of ball swivel 30, which may be comprised of metal or by other materials known, and then by attaching the bottom of short rod 33a to the top center of the pivoting ball bearing 36 in the bottom section of the dual piece block of ball swivel arm 30, by welding or by other methods known, and then by attaching the top of the dual block of ball swivel arm 30, to the bottom of dual block of ball swivel arm 30, by welding, or by other methods known.

And then by attaching by welding or by other methods known short rod 33a to the bottom center of base spacer 33 will allow for the assembly of ball swivel arm 30 to adjustable gun rest arm 32. By attaching tension knob 31, comprised of metal and plastic or by other materials known to the dual block of ball swivel arm 30 by threading the shaft end of tension knob 31 into a threaded hole in the side of dual block of ball swivel arm 30 that protrudes through and into pivoting ball bearing 36, that is located in the bottom of dual piece block of ball swivel arm 30. By turning in tension knob 31 and moving gun rest arm 32 and ball swivel arm 30, now connected together will allow ball swivel arm 30 and adjustable gun rest arm 32 to be locked into a selected position the user requires for shot placement.

Operation

In actual use the portable gun rest 10 in FIG. 1, the user would while wearing portable gun rest 10 around the waist, by belt 17 of gun rest 10, the user would find a suitable spot for hunting or target shooting. Then by unclipping belt 17 by pushing in on clip 17a and pulling out on clip 17b will remove portable gun rest 10. The user would then lay portable gun rest 10 on the ground and unfold portable gun rest 10 by unlatching Velcro 24's from Velcro 26s, the user would then lift the back rest 16 up from base 12, then turn over portable gun rest 10 to the backside of portable gun rest 10 (see FIG. 2). Then the user would unclip adjusting support feet 22 from holding clips 28 by just pulling on adjusting support feet 22, the user would unfold adjusting support feet 22 to the back end of base 12. Then the user would unclip gun cradle 34, and adjustable gun rest arm 32, and ball swivel arm 30, from holding clip 28 the user would then unfold 34, 32, and 30, and would then turn gun rest 10 back over to its top. The user would then lift up back rest 16, and by leaning backrest 16 forward could then unclip adjusting bar 20, from holding clips 28 by pulling out on adjusting bar 20, user would place the bottom of adjusting bar 20 across and into the grooves of supporting base feet 22, this will support the user back thus helping with shot placement. Now that portable gun rest 10 is unfolded the user can now sit down on seat 14, and by straddling 34, 32, and 30 the user can grasp in hand and lift up 34, 32, and 30 enough to clear the top of the cut out portion of base 12, the user by pushing in on both adjusting pins 46 can telescopically extend adjusting arm 32 sections a, b, and c to the required height that the user has selected by releasing adjusting pins 46 back through the holes on the section of adjusting arm 32 that the user has selected for adjustments. By pushing in on locking pins 32d located at the bottom of adjusting gun rest arm 32 sections a and b and by pulling up and releasing locking pins 32d in the desired holes will lock adjusting gun rest arm 32 sections a, b, and c together at the desired height that the user needs for shot placement. Now that the user has selected the desired height and locked it in the user can now place ball swivel arm 30 into holding clip 28 located at the top center of seat 14 by pushing in on ball swivel arm 30 into holding clip 28 thus locking in 30, 32, and 34 to seat 14. By laying or leaving down backrest 16 the user can now rotate as a single unit to any position in a three hundred and sixty degree radius. By not locking in components 30, 32, and 34 into holding clip 28 of seat 14 the user can by lifting up on components 30, 32, and 34 enough that they clear cut out portion of base 12, can select desired position and angle by moving components 30, 32, and 34 left, right, forward, and backwards and can lock in the desired position and angle by tightening tension knob 31 located on the bottom of the dual block of ball swivel arm 30. The user while holding onto components 30, 32, and 34 with free hand can now with shooting hand place his or her gun into gun cradle 34. The user can adjust gun cradle 34 by moving or swiveling gun cradle 34 in any direction and position desired and can lock gun cradle 34 in the user selected position by tightening tension knob 31 located on pivoting ball bearing 36 block of gun cradle 34. The user also can rotate in seat 14 with all of components 30, 32, and 34 and gun by lifting up slightly enough so to clear the top of base 12 and by laying down or by leaving down backrest 16, the user with all components 30, 32, and 34 and gun can rotate a full three hundred and sixty degrees, for a moving shot, the user after shooting can lock all of components 30, 32, and 34 with gun to seat 14 by pulling these components back into holding clip 28 of seat 14 which would allow for a steadier shot.

Advantages

From the detailed description and operation pages a number of advantages of some of the embodiments of my portable gun rest has become evident:
a) The portable gun rest is fully adjustable and provides a sturdy rest and an array of adjustments settings for the shooter, whether it is for hunting or target shooting.
b) The three hundred and sixty degree range of shooting motion that the gun rest provides.
c) The seat provides for great comfort which allows the hunter or target shooter to be more relaxed, thus allowing for better shot placement and for the shooter to remain seated longer, thus giving them a better chance of seeing and shooting game.
d) The backrest allows for better adjustments and comfort resulting in better-shot placement.
e) The lightweight material used on the gun rest will keep the unit as a whole, light and compact, thus making portable gun rest easier to carry over any terrain.
f) The adjustable belt makes the portable gun rest easier to carry around ones waist, thus allowing the user's hands to remain free for other things.

Accordingly, the reader will see the gun rest and all of its embodiments will provide for better adjustments. The portable gun rest will be lighter and more compact, thus making the portable gun rest easier to transport over any terrain and all the while leaving the user's hands free to carry other things or to take a shot and when in use will allow the portable gun rest and shooter altogether to rotate in a three hundred and sixty degree range of motion.

I claim:

1. A portable gun rest with a seat, a base, and means to place said seat unto said base, said seat having rotary motion and said base having a plurality of support feet, each support foot having one end connected to bottom of said base, and each one being located on either side of bottom and to the back end of said base, and unfolding outwardly to the back end of said base to the point of extending out past the back end of said base; a backrest attached to back end of said base, an adjusting bar located on backside of said backrest, that can be folded outward toward and placed into said support feet and that can be folded back and attached to said backside of said backrest and said backrest can be laid flat to allow for three hundred and sixty degree rotation of said seat, a ball swivel arm attached to center of said seat, an adjusting gun rest arm having a plurality of sections, and having holes on same side of sections but opposite of each other, and having sections of different sizes in which to slide into one another, a gun cradle attached to top of said adjusting gun rest arm, an adjusting device located and attached to bottom of said gun cradle and attached into said adjusting gun rest arm sections, and attached to said ball swivel arm, and attached to said seat in which all together can as a single unit rotate three hundred and sixty degrees, and that can be collapsed and folded under and attached to bottom of said base.

2. A portable gun rest as in claim 1, further including, a plurality of Velcro pitches, located on the backside and opposite of each other of said backrest, and by attaching said Velcro pitches to a plurality of Velcro catches located on the front end on the bottom side of said base to each other to secure said backrest to said base, thus securing said seat, attached ball swivel arm, adjusting gun rest arm, gun cradle, and adjusting device that can be collapsed and folded underneath to bottom of said base.

3. A portable gun rest as in claim 1, further including, a plurality of stabilizers, located on the front end of the bottom side of said base.

4. A portable gun rest as in claim 1, further including, a belt, located in between bottom of said backrest and backend of said base, and attached to said belt on opposite ends are a push clip and catch clip and when pushed together around a users waist secures said portable gun rest, for portability of the portable gun rest.

* * * * *